F. MULLER, Jr.
CARRIER ATTACHMENT.
APPLICATION FILED MAY 8, 1917.
1,260,937.
Patented Mar. 26, 1918.
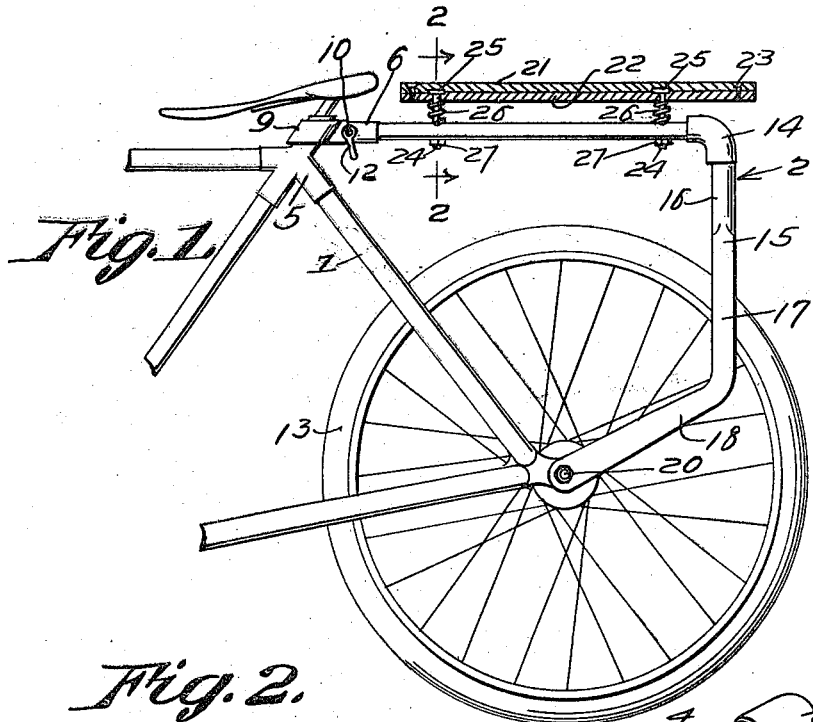
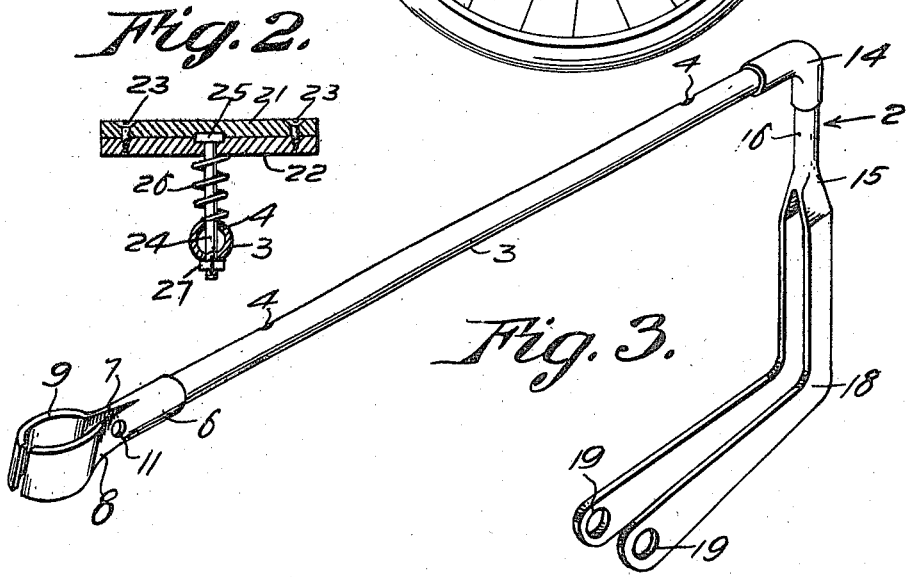
Inventor
Fred Muller Jr.,
By Talbert & Parker
Attorneys

UNITED STATES PATENT OFFICE.

FRED MULLER, JR., OF HEWLETT, NEW YORK.

CARRIER ATTACHMENT.

1,260,937.  Specification of Letters Patent.  Patented Mar. 26, 1918.

Application filed May 8, 1917. Serial No. 167,283.

*To all whom it may concern:*

Be it known that I, FRED MULLER, Jr., a citizen of the United States, residing at Hewlett, L. I., in the county of Nassau and State of New York, have invented certain useful Improvements in Carrier Attachments, of which the following is a specification, reference being had therein to the accompanying drawing.

The present invention has reference generally to improvements in that class of inventions known as package and article carriers and more particularly relates to a carrier attachment for a bicycle or motorcycle.

The invention, as its principal aim and object resides in the provision of novel means for resiliently supporting the main platform on the supporting bar forming a part of the frame of the carrier attachment so that packages may be conveniently and effectively supported thereon.

As an additional object the present invention contemplates the provision of improved clamping means carried by the bar and engageable with the frame of the bicycle or motorcycle for facilitating the maintenance of the carrier attachment in an upright position in the rear of the main frame of the bicycle.

As a further improvement, the invention contemplates the provision of improved means forming a part of the frame of the carrier attachment for engagement with the rear axle of the bicycle or motorcycle for aiding in the maintenance of the attachment in an upright position.

Among the other aims and objects of the present invention may be recited the provision of a device of the character mentioned with a view to compactness, and in which the number of parts are few, the construction simple, the cost of production low and the efficiency high.

Other objects as well as the nature, characteristic features and scope of this invention will be more readily apparent from the following description taken in connection with the accompanying drawings and pointed out in the claims forming a part of this specification.

The preferred embodiment of the invention is clearly illustrated in the accompanying drawings, in which:—

Figure 1 is a side elevation of the attachment in position on a bicycle frame, parts being shown in section.

Fig. 2 is a transverse section taken on line 2—2 of Fig. 1.

Fig. 3 is a perspective detail of the frame of the carrier attachment.

Similar characters of reference are employed in all of the above described views, to indicate corresponding parts.

Referring now, more particularly, to the accompanying drawings the numeral 1 designates the frame of the bicycle or motorcycle to the rear end of which is removably connected the improved package carrier attachment therefor, indicated in its entirety by the numeral 2.

In the present instance the carrier consists of a supporting bar 3 preferably tubular in configuration and provided with spaced vertically extending openings 4 for a purpose that will presently appear. In order to removably connect the bar to the upper portion of the four-way coupling 5 of the bicycle frame the coupling 6 is telescoped about one end of the bar being rigidly secured thereto. The outer end of the coupling is bifurcated as indicated by the numeral 7 while the portions to the sides thereof constitute resilient clamping arms 8 the outer ends of which are bent in opposite directions to provide the semicircular frame engaging portions 9 which are opposed to each other as indicated in Fig. 4 and which are removably held in engagement with the four-way coupling by means of a bolt 10 which engages the alining openings 11 in the inner portions of the clamping arms and is in turn engaged by the winged nut 12. By this arrangement it will be appreciated that the semicircular portions 9 may be readily removably clamped into substantially rigid relation with the upper portion of the coupling 5 to facilitate the maintenance of the bar in a position longitudinally and rearwardly from the frame and preferably above the rear wheel 13 as indicated.

With a view toward providing suitable means for removably connecting the outer end of the bar 3 to the bicycle 1 an elbow coupling 14 has one portion rigidly connected to the opposite end of the bar while a fork 15 has the shank 16 thereof rigidly arranged in the other portion of the elbow coupling 14 and depends therefrom. The arms 17 of the fork have their outer portions bent inwardly as at 18, being arranged upon opposite sides of the rear wheel 13 while alining openings 19 are formed in the arms adjacent the outer terminals to permit of the arms being arranged about the rear axle 20 so that the bar 3 may be consequently supported in a horizontal position rearwardly of the frame of the bicycle and parallel with the reach bar of the frame 1.

As intimated, a platform has been provided and consists of superposed substantially rectangular sections 21 and 22 connected to each other by suitable fastening devices 23. Bolts 24 are now mounted in suitable spaced openings in the lower section 22 and are arranged longitudinally and medially of the said sections, the heads 25 of the bolts being countersunk between the adjacent faces of the sections while the outer ends of the bolts are slidably mounted in the spaced openings 4 in the bar.

In order to resiliently support the platform with respect to the bar suitable resilient means have been provided and embody coil springs 26 the respective ends of which bear against the under surface of the lower section 22 and the upper surface of the bar 3, the tension of the springs being controlled by suitable adjusting elements such as nuts 27 engageable with the projecting ends of the bolts and coöperating with the lower portions of the bar 3.

It is believed in view of the foregoing description that a further detailed description of the operation is entirely unnecessary. Likewise it is believed that the advantages of the invention will be readily apparent.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent is:—

1. In a device of the character described, a supporting bar, a coupling on the inner end of the bar, frame clamping arms formed on the coupling, means for adjusting the clamping arms, a fork depending from the outer end of the bar, the arms of the fork being adapted to be arranged in straddled engagement with the rear wheel of a bicycle, the free ends of the arms having openings therein adapted for engagement with the rear axle of a bicycle so as to consequently coöperate with the clamping arms and maintain the bar in a horizontal position, and a platform resiliently mounted on the supporting bar.

2. A carrier attachment for bicycles comprising a supporting bar having spaced openings therein, a coupling on the inner end of the bar, frame clamping arms formed on the coupling, means for adjusting the clamping arms, a fork depending from the outer end of the bar, the arms of the fork being adapted to be arranged in straddled engagement with the rear wheel of a bicycle, the free ends of the fork arms having openings therein adapted for engagement with the rear axle of a bicycle so as to consequently coöperate with the clamping arms and maintain the bars in a horizontal position, a platform consisting of superposed sections, bolts anchored between the sections and depending therefrom and slidably mounted through the openings in the bar, coil springs arranged about the bolts and having their respective ends bearing against the platform and the bar, and nuts on the outer ends of the bolts and coöperating with the lower portion of the bar for regulating the tension of the springs.

In testimony whereof I affix my signature.

FRED MULLER, Jr.

Copies of this patent may be obtained for five cents each, by addressing the "Commissioner of Patents, Washington, D. C."